US012762397B2

(12) United States Patent
Saeedi et al.

(10) Patent No.: US 12,762,397 B2
(45) Date of Patent: Oct. 13, 2026

(54) FRAMEWORK FOR COMPRESSION-AWARE TRAINING OF NEURAL NETWORKS

(71) Applicants: Advanced Micro Devices, Inc., Santa Clara, CA (US); ATI Technologies ULC, Markham (CA)

(72) Inventors: Mehdi Saeedi, Markham (CA); Ian Charles Colbert, San Diego, CA (US); Ihab M. A. Amer, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 1046 days.

(21) Appl. No.: 17/949,082

(22) Filed: Sep. 20, 2022

(65) Prior Publication Data

US 2024/0095517 A1 Mar. 21, 2024

(51) Int. Cl.
*G06N 3/08* (2023.01)
*G06N 3/084* (2023.01)

(52) U.S. Cl.
CPC ............... *G06N 3/08* (2013.01); *G06N 3/084* (2013.01)

(58) Field of Classification Search
CPC ........... G06N 3/08; G06N 3/084; G06N 3/045
See application file for complete search history.

(56) References Cited

U.S. PATENT DOCUMENTS

| | | | | |
|---|---|---|---|---|
| 2015/0278574 A1* | 10/2015 | Boshra | G06V 40/1359 382/125 |
| 2019/0027249 A1* | 1/2019 | Fuksenko | G16H 50/50 |
| 2019/0095784 A1* | 3/2019 | Crill | G06N 3/0675 |
| 2020/0088700 A1* | 3/2020 | Yamaguchi | G01N 30/72 |
| 2021/0089865 A1* | 3/2021 | Wang | G06N 3/045 |
| 2024/0371093 A1* | 11/2024 | Tsukatani | G06T 5/94 |

FOREIGN PATENT DOCUMENTS

| | | | |
|---|---|---|---|
| CN | 101399023 B * | 6/2011 | G09G 3/3426 |
| KR | 20060127629 A * | 12/2006 | H04N 23/843 |

* cited by examiner

*Primary Examiner* — Mariela Reyes
*Assistant Examiner* — Skieler Alexander Kowalik
(74) *Attorney, Agent, or Firm* — Volpe Koenig

(57) ABSTRACT

Methods and devices are provided for processing data using a neural network. Activations from a previous layer of the neural network are received by a layer of the neural network. Weighted values, to be applied to values of elements of the activations, are determined based on a spatial correlation of the elements and a task error output by the layer. The weighted values are applied to the values of the elements and a combined error is determined based on the task error and the spatial correlation.

19 Claims, 6 Drawing Sheets

FRAMEWORK FOR COMPRESSION-AWARE TRAINING OF NEURAL NETWORKS

BACKGROUND

Machine learning is widely used in a variety of technologies (e.g., image classification, nature language processing, and other technologies). Machine learning (e.g., deep learning) can be used to allow a machine to learn from data to make predictions or decisions to perform a particular task (e.g., whether an image includes a certain object).

Neural networks, such as convolutional neural networks (CNNs) are used in machine learning applications. Neural networks can be trained in order to make predictions or decisions to perform a particular task (e.g., whether an image includes a certain object). During training, a neural network model is typically exposed to different data. Each layer of a CNN network is responsible for data processing (e.g., transformation) during forward propagation (e.g., a forward propagation pass), as well as receiving feedback regarding the accuracy of its operations during backward propagation (e.g., a back propagation pass). During an inference stage, the trained neural network model is used to infer (i.e., as inference) or predict outputs on testing samples (e.g., input tensors).

BRIEF DESCRIPTION OF THE DRAWINGS

A more detailed understanding can be had from the following description, given by way of example in conjunction with the accompanying drawings wherein.

DETAILED DESCRIPTION

Figure 1:
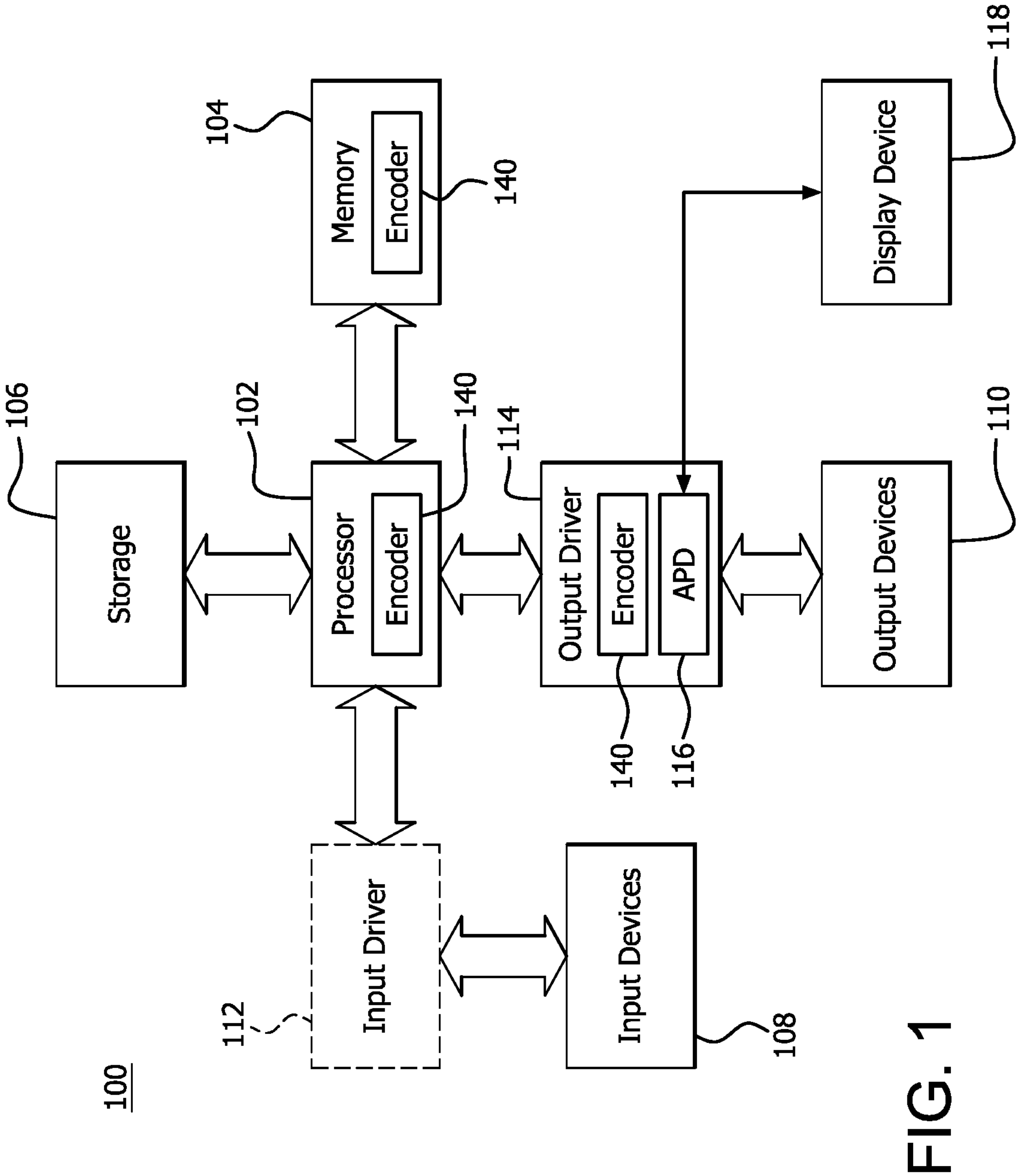
FIG. 1 is a block diagram of an example device in which one or more features of the disclosure can be implemented.

As used herein, programs include sequences of instructions to be executed using one or more processors to perform procedures or routines (e.g., operations, computations, functions, processes, jobs). Processing of programmed instructions and data includes one or more of a plurality of processing stages, such as but not limited to fetching, decoding, scheduling for execution, executing and decoding the programmed instructions and data. Programmed instructions include, for example, applications and control programs, such as operating systems. Processors may include, for example, multiple processing cores (e.g., compute units (CUs)) each of which are configured to read and execute program instructions, such as instructions to execute a method of executing a neural network.

Neural networks (e.g., deep neural networks) are structured as pipelined operations which are referred to as layers. These pipelines are typically sequential, where the outputs from a previous layer are used as the inputs of a next layer. During forward propagation of a neural network (i.e., moving from an input layer to another layer), the feature maps (or activation maps) are generated at each layer by, for example, applying filters (e.g., convolution and/or non-linearity) to layers in sequence which produce a transformed version of that feature map. The filters are used to extract and identify different features (e.g., edges, lines, textures and other features) present in an image (if input is an image). In some cases, the feature maps are generated without filters (e.g., linear operations, recurrent operations, and parameterized layers). During backward propagation of a neural network (i.e., moving from the output layer to the input layer), the model learns to adjust its parameters to improve the accuracy of the inferences and predictions.

Neural networks have continued to grow in both depth and width, where the number of layers being stacked together and the number of parameters in each layer is increasing. In addition, recent neural networks utilize a more complex control flow that includes recursive elements, branching, and skip connections, which combine to create an increased overhead (e.g., memory usage and power consumption) when moving and storing activation data between layers. Accordingly, execution of these deep learning models uses significant memory bandwidth, which typically leads to performance bottlenecks and increased power consumption. In addition, the memory requirements to store activation matrices are typically too large to fit in on-chip memory, resulting in inefficient transfer of data to and from off-chip memory.

Compression algorithms (e.g., delta-based compression) can be used to reduce memory bandwidth utilization and power consumption when transferring and storing data. Such compression algorithms have been used to reduce activation data when executing neural networks (e.g., CNNs). For example, one can use lossless or lossy delta-based compression algorithms to compress the activation data of deep neural networks and discard redundant information before transferring to/from memory. However, the efficiency of these delta-based compression algorithms depends on the similarity between adjacent values in the data. Accordingly, despite the use of such delta-based compression algorithms the ever-increasing large number of stacked layers and parameters can still result in a large overhead (e.g., memory usage and power consumption).

Features of the present disclosure improve the effectiveness and performance of delta-based compression algorithms by encouraging the model to learn feature map representations which result in more efficient activation compression. Features of the present disclosure increase the similarity of data in local areas (e.g., a block or other portion) of the feature maps to facilitate the learning of more easily compressible feature maps during training.

Features of the present disclosure improve the performance of delta-based compression engine when it is used to compress the activation data during the inference stage. Features of the present disclosure can also be implemented with any delta-based lossy compression algorithm.

Features of the present disclosure add a regularization term to a loss function, which facilitates reducing an average difference (e.g., variance) of pixel values within a portion of an image (e.g., block size). Accordingly, differences in the pixel values in local areas (e.g., pixels within a predetermined portion (e.g., block)) of the feature maps are reduced, resulting in overall higher compression ratios (e.g., higher compression ratios of delta-based compression algorithms).

A method of processing data using a neural network is provided which comprises receiving, by a layer of the neural network, activations from a previous layer of the neural network, determining first weighted values to be applied to values of elements of the activations based on a spatial correlation of the elements and a task error output by the layer, applying the first weighted values to the values of the elements and determining a combined error based on the task error and the spatial correlation.

A device for processing data using a neural network is provided which comprises memory and a processor. The processor is configured to receive, by a layer of the neural network, activations from a previous layer of the neural network, determine first weighted values to be applied to values of elements of the activations based on a spatial correlation of the elements and a task error output by the layer, apply the first weighted values to the values of the elements and determine a combined error based on the task error and the spatial correlation.

A non-transitory computer readable medium is provided which comprises instructions for causing a computer to execute a method processing data using a neural network. The instructions comprise receiving, by a layer of the neural network, activations from a previous layer of the neural network, determining first weighted values to be applied to values of elements of the activations based on a spatial correlation of the elements and a task error output by the layer, applying the first weighted values to the values of the elements and determining a combined error based on the task error and the spatial correlation.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. As shown in FIG. 1, the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. In addition to processing compute and graphics rendering commands and providing pixel output to display device 118, APD 116 may also control the encoder 140 for encoding video images according to features of the disclosure. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
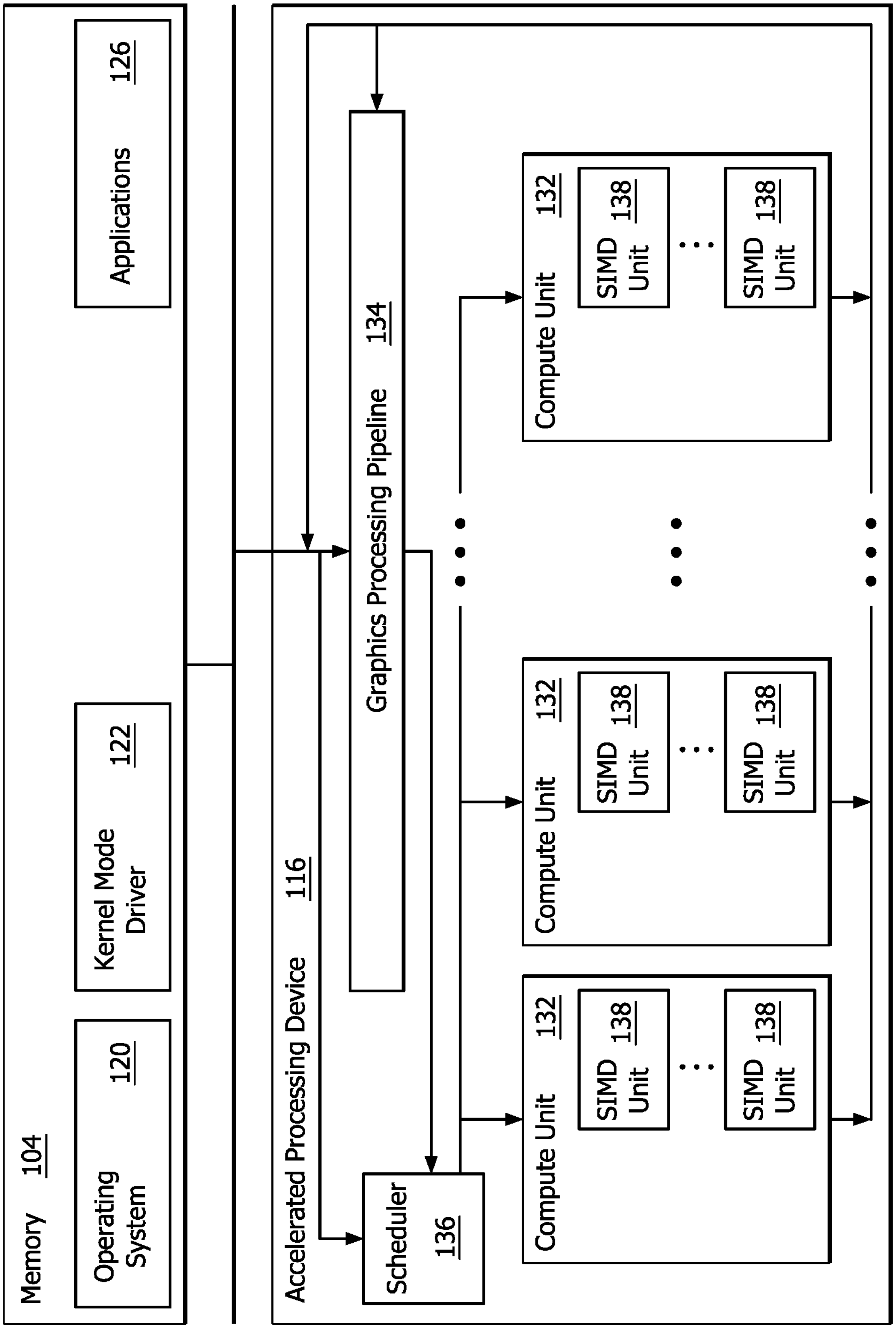
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138. For example, scheduler 136 is used to schedule processing of image data on a sub-frame portion (e.g., slice or tile) basis.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
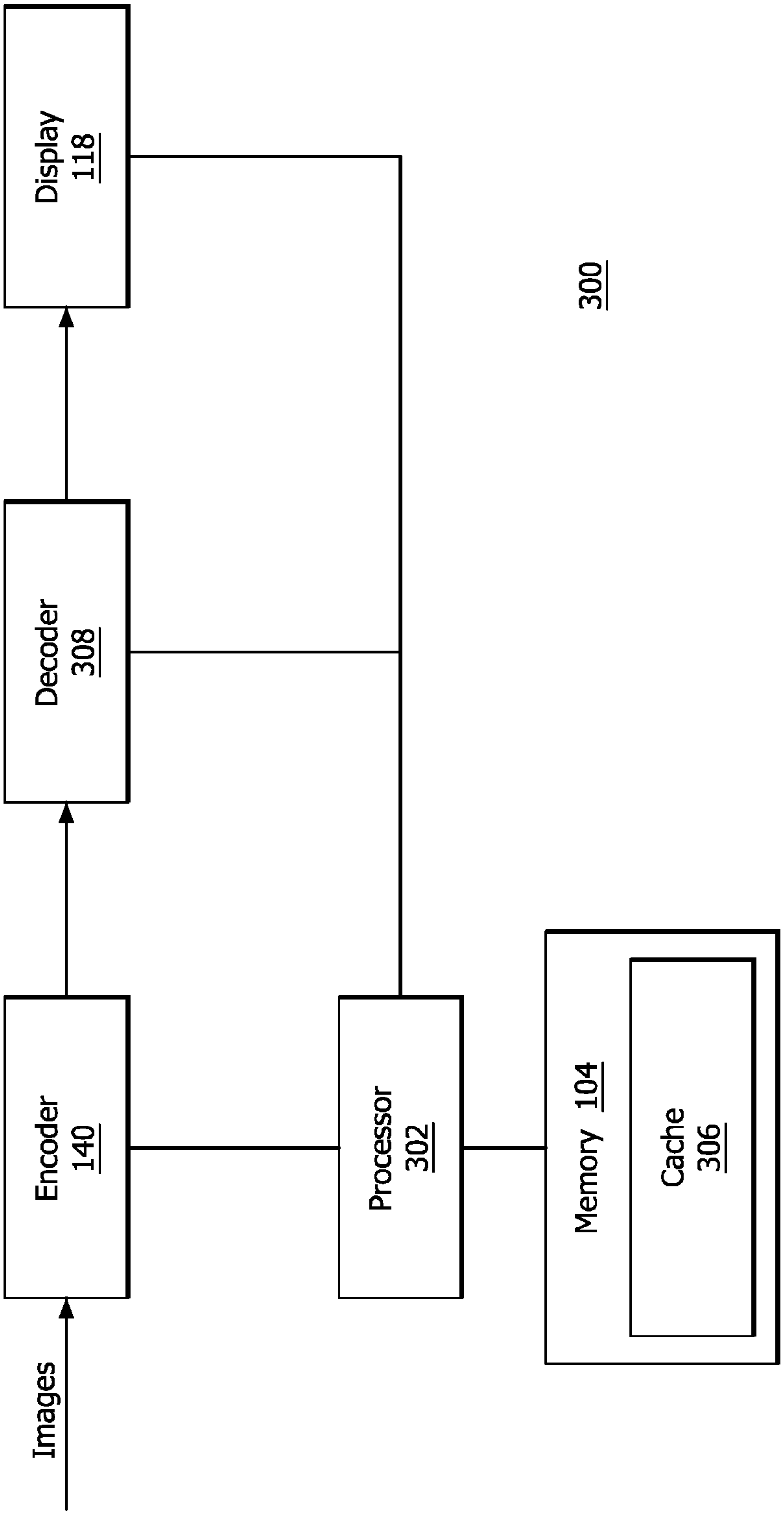
FIG. 3 is a block diagram illustrating exemplary components of a processing device in which one or more features of the disclosure can be implemented.

FIG. 3 is a block diagram illustrating exemplary components of a processing device 300 in which one or more features of the disclosure can be implemented. Processing device 300 is used to process image data as described in more detail below. As shown in FIG. 3, processing apparatus 300 comprises processor 302, memory 104, including cache 306, encoder 140, decoder 308 and display 118. Alternatively, decoder 308 and display 118 can be separate from device 300 and in communication with processing device 300 via a wired or wireless network.

As shown in FIG. 3, processor 302 is in communication with encoder 140, memory 104 (which includes cache 306), decoder 308. and display 118 (e.g., via display controller). Encoder 140 is configured to receive video images and encode the images to be decoded by decoder 308 and displayed at display device 118. The images can be received from one or more sources, such as a video capture device (e.g., a camera), a storage device (e.g., storage 106), a video content provider, and a device for generating graphics (e.g., APD 116).

Processor 302 is, for example, an accelerated processor, such as APD 116 (shown in FIGS. 1 and 2) or a low power inference accelerator (e.g., an intelligence Processing Unit (IPU) configured for machine learning and artificial intelligence, a tensor processing unit (TPU) tailored for inferencing, or other low power inference accelerator). Processor 302 is configured to perform various functions, as described in detail herein, for implementing features of the present disclosure.

For example, processor 302 is configured to receive frames of image data comprising a plurality of sub-frame portions (e.g., slices or tiles), schedule frames to be processed and process (e.g., inference processing) the frames of image data on a sub-frame portion basis (e.g., block, tile) using, for example, a CNN, a multilayer perceptron network, an attention network, a long short-term memory (LSTM) network, or another type of neural network. The processor 302 is also configured to execute such processing using (e.g., write to and read from) both local memory (e.g., register files, LDS or other memory local to the processor 302) and non-local memory (e.g., global memory or main memory).

The processed image data is provided to display device 118 for displaying the image data. The display device 118, is for example, a head mounted display, a computer monitor, TV display, a display in an automobile or another display device configured to display image data.

Figure 4:
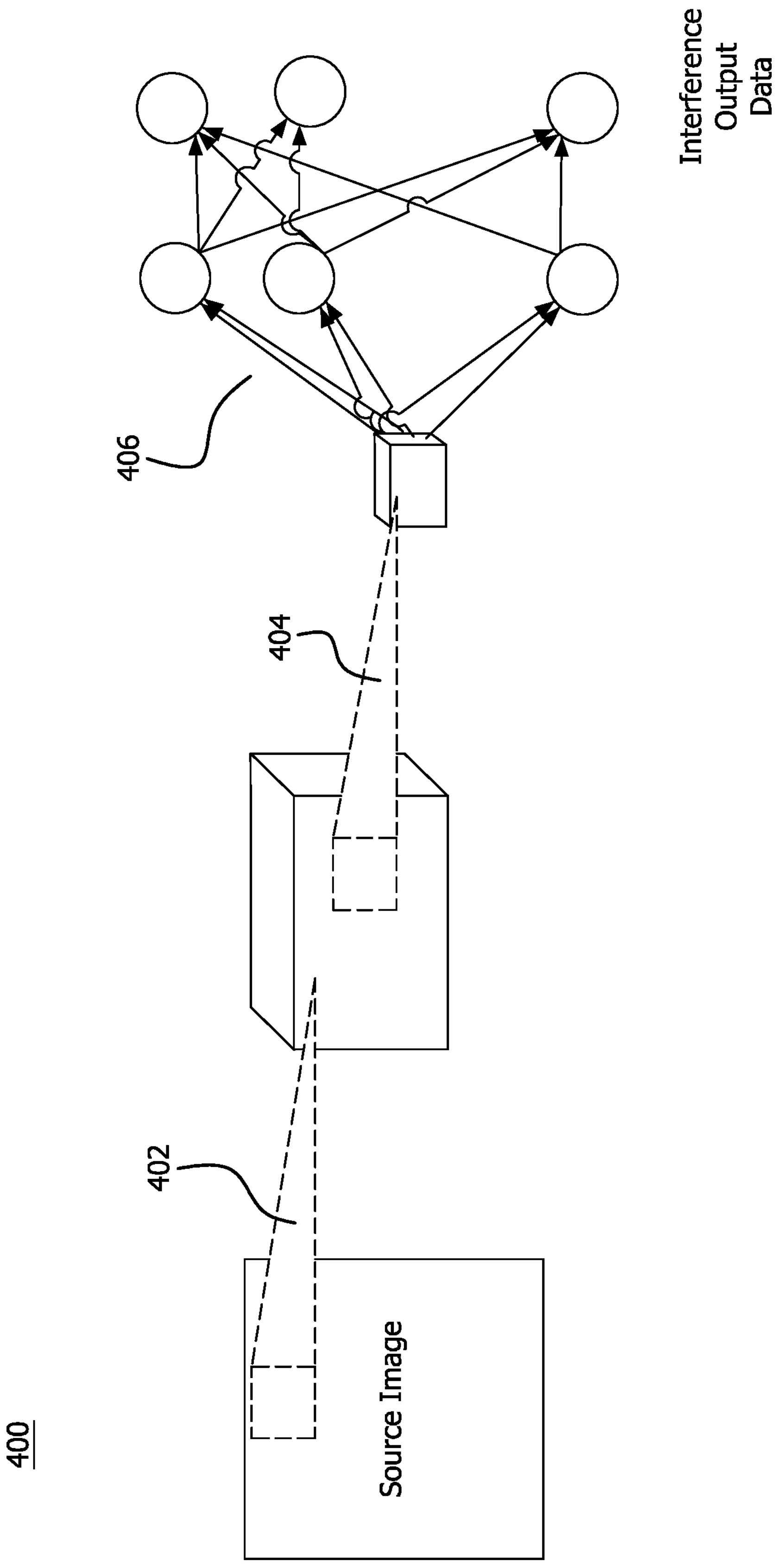
FIG. 4 illustrates an example of different processing layers of a CNN, which can be used to process data according to features of the present disclosure.

FIG. 4 illustrates an example of different processing layers of a CNN 400, which can be used to process data according to features of the present disclosure. The CNN 400 shown in FIG. 4 is merely an example of a neural network. Features of the present disclosure can be implemented using other types of neural networks, such as for example, a multilayer perceptron network, an attention network, a long short-term memory (LSTM) network. The CNN 400 shown in FIG. 4 includes a convolutional layer 402, a max pooling layer 404 and a rectified linear unit (ReLU) layer 406. The layers shown in FIG. 4 are merely an example. Features of the disclosure can be implemented by processing image data on a sub-frame portion basis using any number of layers of a CNN (or other neural network), including the same layers or different layers than those shown in FIG. 4.

The outputs from one layer of the neural network 400 are used as the inputs of a next layer of the neural network 400. For example, in the neural network 400, the outputs from convolutional layer 402 are used as the inputs of max pooling layer 404.

During forward propagation, the feature maps (or activations) are generated at each layer (e.g., convolutional layer 402, max pooling layer 404 and RelU layer 406) by applying an algorithm (e.g., convolution and/or non-linearity algorithm) and learnable weights to values of the input layers which produce different versions (e.g., down-sampled versions of images having multiple features but at a lower resolution) of the images. For example, activations are generated at convolutional layer 402 by applying a convolution algorithm and learnable weights to values of the input layers. The algorithm and learnable weights are used to extract and identify different features (edges, lines, textures and other features) present in an image and processed (e.g., pooled) to produce output layers, which are used to make inferences and predictions of the images for tasks, such as image classification, object detection (e.g., objects in the image) and image segmentation. During backward propagation (i.e., moving from the output layer to the input layer), parameters are adjusted or corrected to improve the accuracy of the inferences and predictions.

Figure 5:
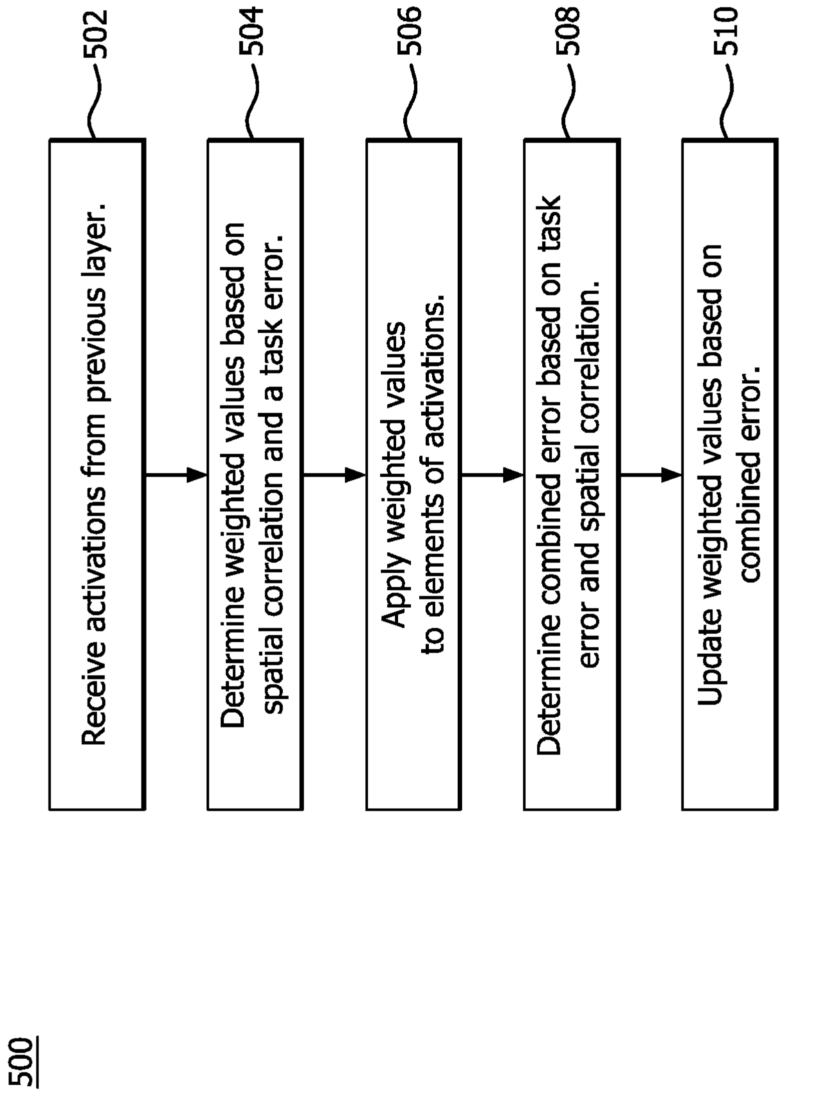
FIG. 5 is a flow diagram illustrating an example method of processing data using a neural network according to features of the present disclosure.

FIG. 5 is a flow block diagram illustrating an example method 500 of processing data using a neural network according to features of the present disclosure. The method 500 is described below using FIG. 6.

Figure 6:
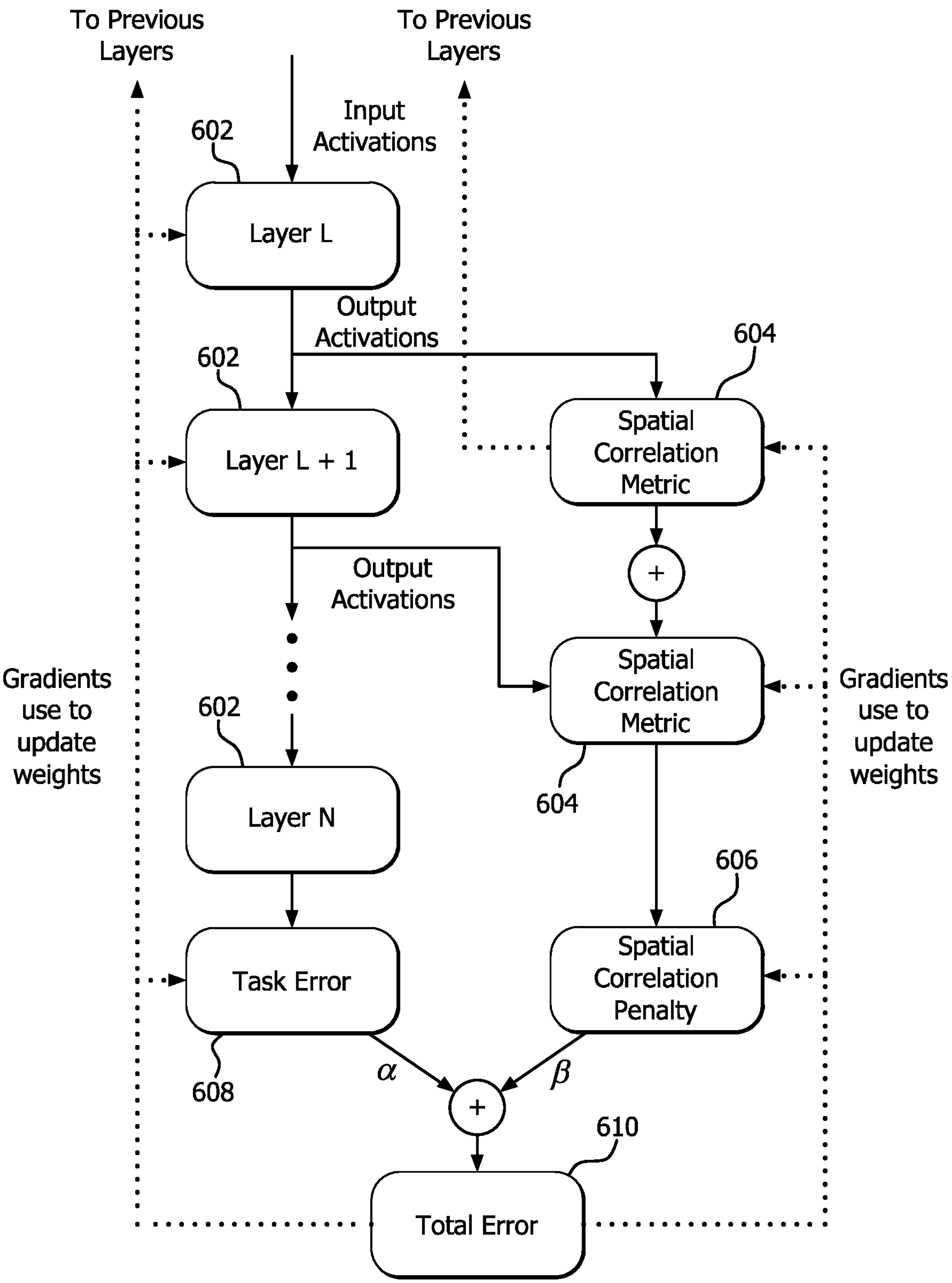
FIG. 6 is a block diagram illustrating an example processing flow of a neural network according to features of the disclosure.

FIG. 6 is a flow block diagram illustrating an example processing flow of a neural network (e.g., neural network 400 in FIG. 4) according to features of the disclosure. The solid arrows shown in FIG. 6 are in the direction of information moving through the network to make a prediction (i.e., forward propagation). The dotted arrows are in the direction of gradients used to update learnable weights (i.e., backward propagation).

As shown at block 502 of FIG. 5, the method 500 includes receiving, by a layer of the neural network, activations from a previous layer of the neural network.

As shown in FIG. 6, input activations are input from a previous layer to a next layer each of the layers 602 (Layer L, Layer L+1, . . . Layer N) of the neural network. For example, activations from layer L are provided to Layer L+1. Activations from Layer L+1 are provided to Layer L+2 (not shown) and activations from Layer N−1 (not shown) are provided to Layer N. Spatial correlations of the values of the activations from each layer are determined at blocks 604.

As shown at block 504, the method includes determining, first weighted values to be applied to values of elements of the activations based on a spatial correlation of the elements and a task error output by the layer.

Compression algorithms based on delta calculations perform more efficiently when there are less abrupt changes in the values of adjacent pixels. Accordingly, a spatial correlation is determined as a measure of similarity between elements (e.g., adjacent pixel values) within a portion (e.g., block) of an image or feature map. Spatial correlation increases as the average difference between the absolute values of elements in the portion of the image or feature map approaches zero.

Each element (e.g., pixel) is modeled as a random variable and the spatial correlation is measured, for example, over a portion (e.g., block) of adjacent pixels (i.e., pixels within a pre-determined portion of an image or feature map using a measure of variance of the elements, which is calculated for example, using EQUATION 1 below:

$$\mathrm{Var}(X)=E[X^2]-E[X]^2 \qquad \text{EQUATION 1}$$

Variance is merely an example of a metric (i.e., statistical measurement parameter) used to determine the spatial correlation. The spatial correlation can also be determined using an average value, or another statistical measurement parameter.

To facilitate the model increasing a similarity of the element values (e.g., reducing an average difference in the values) over a number of portions (e.g., blocks or receptive fields), a convolution layer is, for example, used with each value of the weights set to $1/K^2$ and padding of 0 and stride of 1. The variance of these portions is determined, for example, by applying EQUATION 2 below:

$$\frac{1}{n}\sum conv(X^2;\theta_K)-conv(X;\theta_K)^2 \qquad \text{EQUATION 2}$$

where n is the number of portions (e.g., blocks) over the activation data. The result is then used as a penalty added to the loss function to be minimized in addition to the standard learning objective.

An increase in the similarity of values can be facilitated using a soft constraint as well as a hard constraint. A soft constraint can be used to facilitate an increase in using more similar values (e.g., encourage the model to learn feature maps that are more similar in local areas during training or increase the probability of using more similar values). For example, certain weights can be selected and a convolution layer can be used with each value of the weights as a soft constraint to facilitate the increase in the similarity of values without implementing a requirement (e.g., a similarity threshold).

Alternatively, a hard constraint can be used to force the model to perform one or more tasks such that, after training, the model will include a particular result (e.g., a particular property). For example, a hard constraint can include implementing a threshold to ensure that average values in a portion of a feature map are within a similarity threshold. While a hard constraint can affect (e.g., limit) a model's performance in another area (e.g., performing one or more other tasks for which the model is trained), in some cases (e.g., applications), a hard constraint can be useful. Decisions of whether to use a soft constraint can include different factors for balancing trade-offs.

As shown at block 506, weighted values are applied to the values of the elements. For example, weighted values are applied to the values of layers L, Layer L+1, . . . Layer N) shown in FIG. 6.

As shown at block 508, the method includes determining a total error (i.e., combined error) based on a task error 608 and a spatial correlation penalty 606. For example, given an input, the neural network provides an output that, in some cases, is a prediction (e.g., classification). The model can also be given a true target during training. The difference between the prediction output of the model and the true target is the task error 608.

A spatial correlation penalty 606 is determined from the spatial correlation measurements using a spatial correlation metric 604 (i.e., a statistical measurement parameter) of each of the layers (Layer L, Layer L+1, . . . Layer N). The spatial correlation penalty is, for example, the sum of the spatial correlation measurements over each of the layers. The spatial correlation penalty can also be an average, a maximum or minimum of the spatial correlation measurements over each of the layers.

A total error (i.e., combined error) is determined from the weighted combination of the task error (with the task error weight being a scalar value α) and the spatial correlation penalty (with the spatial correlation loss weight being a scalar value β). In some cases, model accuracy and activation compressibility can be balanced as β=1−α, where a is between 0 and 1 (i.e., a convex combination).

As shown at block 510, the method includes updating the weighted values via gradients determined from the total error 610 (i.e., combined error). That is, based on the total error 610, the gradients are used to update the weighted values applied to the values of the spatial correlation penalty 606, the spatial correlation metrics 604, the task error 608 and each layer 602.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, 302, the input driver 112, the input devices 108, the output driver 114, the output devices 110, the accelerated processing device 116, the scheduler 136, the compute units 132, the SIMD units 138, encoder 140, decoder 308, and display 118, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The various functional units illustrated in the figures and/or described herein (including, but not limited to, the processor 102, 302, the input driver 112, the input devices 108, the output driver 114, the output devices 110, the accelerated processing device 116, the scheduler 136, the compute units 132, the SIMD units 138, encoder 140, decoder 308, and display 118, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for reducing off-chip memory bandwidth and power consumed when processing data using a neural network, the method comprising:

during an inference pass:

receiving, by a processor, activations from a previous layer of the neural network;

retrieving, by the processor, first weighted values determined during training of the neural network based on a combined error, wherein the combined error was determined during the training based on a task error and a spatial correlation of elements of activations generated during the training;

applying, by the processor, the first weighted values to values of elements of the activations received from the previous layer to generate intermediate activations; and before writing the intermediate activations to off-chip memory, reducing, by the processor, off-chip memory bandwidth consumed by compressing the intermediate activations using a delta-compression engine.

2. The method of claim 1, wherein the combined error is further determined based on a second spatial correlation of elements of activations from a next layer of the neural network.

3. The method of claim 2, wherein the combined error is determined based on a spatial-correlation penalty determined from a combination of the spatial correlation and the second spatial correlation.

4. The method of claim 3, wherein the combined error is determined based on a weighted combination of the task error and the spatial-correlation penalty.

5. The method of claim 1, wherein a portion of the activations corresponds to a layer of the neural network.

6. The method of claim 1, wherein the first weighted values were updated during the training based on the combined error.

7. The method of claim 5, wherein the spatial correlation is determined from a variance of values of the elements of the activations generated during the training.

8. The method of claim 5, wherein the spatial correlation is determined from a mean value of the elements of the activations generated during the training.

9. A device for reducing off-chip memory bandwidth and power consumed when processing data using a neural network, the device comprising:

on-chip memory;

an external memory interface coupled to off-chip memory;

a delta-compression engine configured to compress intermediate activations before the intermediate activations are written to the off-chip memory; and one or more processors configured to:
during an inference pass:
receive activations from a previous layer of the neural network;
retrieve first weighted values determined during training of the neural network based on a combined error, wherein the combined error was determined during the training based on a task error and a spatial correlation of elements of activations generated during the training;
apply the first weighted values to values of elements of the activations received from the previous layer to generate the intermediate activations;
reduce the off-chip memory bandwidth consumed by invoking the delta-compression engine to compress the intermediate activations; and
write the compressed intermediate activations across the external memory interface to the off-chip memory.

10. The device of claim 9, wherein the combined error is further determined based on a second spatial correlation of elements of activations from a next layer of the neural network.

11. The device of claim 10, wherein the combined error is determined based on a spatial-correlation penalty determined from a combination of the spatial correlation and the second spatial correlation penalty.

12. The device of claim 11, wherein the combined error is determined based on a weighted combination of the task error and the spatial-correlation penalty.

13. The device of claim 9, wherein the first weighted values were updated during the training based on the combined error.

14. The device of claim 9, wherein the spatial correlation is determined from a variance of values of the elements of the activations generated during the training.

15. The device of claim 9, wherein the spatial correlation is determined from a mean value of the elements of the activations generated during the training.

16. The device of claim 9, further comprising a display device, wherein data processed using the neural network is displayed as images on the display device.

17. A non-transitory computer-readable medium storing instructions for reducing off-chip memory bandwidth and power consumed when processing data using a neural network, the instructions, when executed by one or more processors, cause the one or more processors to perform operations comprising:
during an inference pass:
receiving activations from a previous layer of the neural network;
retrieving first weighted values determined during training of the neural network based on a combined error, wherein the combined error was determined during the training based on a task error and a spatial correlation of elements of activations generated during the training;
applying the first weighted values to values of elements of the activations received from the previous layer to generate intermediate activations; and
before writing the intermediate activations to off-chip memory, reducing off-chip memory bandwidth consumed by compressing the intermediate activations using a delta-compression engine.

18. The method of claim 1, wherein the spatial correlation is calculated by measuring similarity between values of elements of a portion of the activations generated during the training.

19. The device of claim 9, wherein the spatial correlation is calculated by measuring similarity between values of elements of a portion of the activations generated during the training.

* * * * *